(12) United States Patent
Hu et al.

(10) Patent No.: US 10,192,096 B2
(45) Date of Patent: Jan. 29, 2019

(54) FINGERPRINT IMAGING MODULE AND ELECTRONIC DEVICE

(71) Applicant: Shanghai Oxi Technology Co., Ltd, Shanghai (CN)

(72) Inventors: Shiwen Hu, Shanghai (CN); Hong Zhu, Shanghai (CN); Yan Ling, Shanghai (CN)

(73) Assignee: SHANGHAI OXI TECHNOLOGY CO., LTD, Shanghai (CN)

( * ) Notice: Subject to any disclaimer, the term of this patent is extended or adjusted under 35 U.S.C. 154(b) by 0 days.

(21) Appl. No.: 15/744,623

(22) PCT Filed: Mar. 1, 2017

(86) PCT No.: PCT/CN2017/075335
§ 371 (c)(1),
(2) Date: Jan. 12, 2018

(87) PCT Pub. No.: WO2018/157334
PCT Pub. Date: Sep. 7, 2018

(65) Prior Publication Data
US 2019/0005294 A1    Jan. 3, 2019

(51) Int. Cl.
*G06K 9/00* (2006.01)
(52) U.S. Cl.
CPC ....... *G06K 9/0004* (2013.01); *G06K 9/00013* (2013.01)
(58) Field of Classification Search
CPC ..... G06K 9/0004; G06K 9/00013; G06K 9/00
See application file for complete search history.

(56) References Cited

U.S. PATENT DOCUMENTS 9,811,713 B2 * 11/2017 Pi .................. H04L 63/0861
2011/0013126 A1 * 1/2011 Wang ............... G02F 1/133555
349/106
(Continued)

FOREIGN PATENT DOCUMENTS

CN        104318199 A    1/2015
CN        106022325 A    10/2016
(Continued)

OTHER PUBLICATIONS

International Search Report and Written Opinion from PCT/CN2017075335, dated Nov. 30, 2017 (with English Translation of Written Opinion).

*Primary Examiner* — Utpal D Shah
(74) *Attorney, Agent, or Firm* — Adsero IP

(57) ABSTRACT

Fingerprint imaging module and electronic device are provided. The module includes: a light source assembly including first light source for generating first incident light and second light source for generating second incident light; a color layer including a non-opaque region corresponding to interval between the first and second light sources and adapted to transmit the first and second incident light; a sensing surface at a side of the color layer away from the light source assembly, wherein the first and second incident light form first and second reflected light on the sensing surface; an image sensor between the light source assembly and the color layer, including first and second photosensitive regions, and configured to acquire the first and second reflected light to acquire fingerprint images. Fingerprint imaging area of the image sensor and size of fingerprint images are increased, which is favorable for recognition of fingerprint images by fingerprint algorithm.

18 Claims, 4 Drawing Sheets

(56) References Cited

U.S. PATENT DOCUMENTS

| | | | | |
|---|---|---|---|---|
| 2012/0062364 | A1* | 3/2012 | Rowe | A61B 5/0075 |
| | | | | 340/5.82 |
| 2012/0258773 | A1* | 10/2012 | Alvarez Rivera | G06F 1/1656 |
| | | | | 455/556.1 |
| 2015/0371074 | A1 | 12/2015 | Lin | |
| 2016/0132713 | A1 | 5/2016 | Bea | |
| 2016/0266695 | A1* | 9/2016 | Bae | G06F 1/1643 |
| 2017/0032169 | A1* | 2/2017 | Pi | G06K 9/00026 |
| 2018/0005005 | A1* | 1/2018 | He | G06F 3/0412 |
| 2018/0260602 | A1* | 9/2018 | He | G06F 3/0412 |
| 2018/0300530 | A1* | 10/2018 | Pi | G06K 9/00053 |

FOREIGN PATENT DOCUMENTS

| | | |
|---|---|---|
| CN | 106159026 A | 11/2016 |
| CN | 106295462 A | 1/2017 |
| CN | 106295534 A | 1/2017 |
| CN | 106295580 A | 1/2017 |
| KR | 20160117863 A | 10/2016 |

\* cited by examiner

FINGERPRINT IMAGING MODULE AND ELECTRONIC DEVICE

CROSS-REFERENCE TO RELATED APPLICATIONS

This application is the national phase of International Application No. PCT/CN2017/075335, filed on Mar. 1, 2017.

TECHNICAL FIELD

The present disclosure generally relates to fingerprint imaging field, and more particularly, to a fingerprint imaging module and an electronic device.

BACKGROUND

Fingerprint recognition technology is used to realize identification by capturing fingerprint images of a person using optical fingerprint sensors and then determining whether the fingerprint images match those stored in a system before. Due to its convenience in use and uniqueness of human fingerprints, the fingerprint recognition technology has been widely applied to various fields, such as safety inspection field (for example, public security bureau or customs), entrance guard systems in buildings or consumption goods field (for example, personal computers or mobile phones).

Among fingerprint imaging modules used in the fingerprint recognition technology, there is a type of optical fingerprint imaging module which can be used to acquire fingerprint images of a human body. Specifically, incident light is generated by a light source and irradiates onto a surface of a finger. Based on the reflection of the finger, reflected light with fingerprint information is formed and received by an image sensor, so as to obtain a fingerprint image.

When the optical fingerprint imaging module is applied to a mobile phone or other mobile devices, the fingerprint imaging module becomes a part of appearance of the device. Therefore, there is a requirement on color of appearance of the sensor. The fingerprint imaging module needs to be colored to adapt appearance design of the device.

However, the color of the appearance and an imaging effect of the colored fingerprint imaging module in existing techniques need to be further improved.

SUMMARY

In embodiments of the present disclosure, a fingerprint imaging module and an electronic device are provided with optimized imaging effect and color of appearance.

In an embodiment of the present disclosure, a fingerprint imaging module is provided, including: a light source assembly including a first light source for generating first incident light and a second light source for generating second incident light, wherein the first light source and the second light source are disposed with an interval therebetween; a color layer disposed at a side of the light source assembly and including a non-opaque region which penetrates through thickness of the color layer, wherein the non-opaque region is disposed corresponding to the interval between the first light source and the second light source, and adapted to transmit the first incident light and the second incident light; a sensing surface disposed at a side of the color layer which is away from the light source assembly, wherein the first incident light is transmitted by the non-opaque region to form first reflected light on the sensing surface, and the second incident light is transmitted by the non-opaque region to form second reflected light on the sensing surface; and an image sensor disposed between the light source assembly and the color layer and including a first photosensitive region and a second photosensitive region, wherein the first photosensitive region is disposed corresponding to a position of the first light source, the second photosensitive region is disposed corresponding to a position of the second light source, and the image sensor is configured to acquire the first reflected light and the second reflected light to acquire a fingerprint image.

Optionally, a distance between the first light source and the sensing surface may be equal to a distance between the second light source and the sensing surface.

Optionally, a shape of the non-opaque region may be an axisymmetric pattern, and along a direction parallel to the sensing surface, the first light source and the second light source may be disposed at two sides of a symmetry axis of the non-opaque region.

Optionally, the first light source and the second light source may be mirroredly disposed with respect to the symmetry axis of the non-opaque region.

Optionally, the first light source may have a first light emitting surface, the second light source may have a second light emitting surface, and the first light emitting surface and the second light emitting surface may be disposed toward the non-opaque region.

Optionally, an included angle between the first light emitting surface and the sensing surface may be within a range from 15° to 45°, and an included angle between the second light emitting surface and the sensing surface may be within a range from 15° to 45°.

Optionally, the sensing surface may have a first direction and a second direction perpendicular to each other, a size of the non-opaque region in the first direction may be greater than or equal to a size of the non-opaque region in the second direction, and the first light source and the second light source may be disposed along the second direction.

Optionally, a shape of the non-opaque region may be circle, square, oval or cross.

Optionally, a shape of the non-opaque region is circle, and a radius of the circular non-opaque region is within a range from 2 mm to 5 mm.

Optionally, a shape of the non-opaque region is square, and length of a side of the square non-opaque region is within a range from 6 mm to 12 mm.

Optionally, a shape of the non-opaque region is oval, length of the oval non-opaque region is within a range from 6 mm to 12 mm, and width of the oval non-opaque region is within a range from 2 mm to 6 mm.

Optionally, a shape of the non-opaque region is cross, the crossed non-opaque region includes a first cross side and a second cross side perpendicular to each other, length of the first cross side is greater than or equal to length of the second cross side, the length of the first cross side is within a range from 6 mm to 12 mm, width of the first cross side is within a range from 1 mm to 2 mm, the length of the second cross side is within a range from 2 mm to 4 mm, and width of the second cross side is within a range from 1 mm to 2 mm.

Optionally, an area of the non-opaque region may be within a range from 16 $mm^2$ to 80 $mm^2$.

Optionally, the image sensor may further include a third photosensitive region disposed at a position corresponding to the non-opaque region.

Optionally, the fingerprint imaging module may further include a light blocking layer disposed between the first photosensitive region of the image sensor and the first light source and between the second photosensitive region of the image sensor and the second light source.

Optionally, the light blocking layer may include a metal.

Optionally, the first light source and the second light source may be light emitting diodes.

In an embodiment of the present disclosure, an electronic device is provided, including: a protective cover; and the fingerprint imaging module provided in the embodiments of the present disclosure, wherein the color layer is disposed on a surface of the protective cover which faces the image sensor.

Embodiments of the present disclosure may provide following advantages. In embodiments of the present disclosure, as the first light source and the second light source are respectively disposed at two sides of the non-opaque region, first and second reflected light are formed to irradiate onto different portions of the image sensor. The image sensor includes the first photosensitive region corresponding to the position of the first light source and the second photosensitive region corresponding to the position of the second light source, so that an area where the image sensor can acquire the first and second reflected light is larger. That is, a fingerprint imaging area of the image sensor is increased, and thus a size of the acquired fingerprint image is increased, which is conducive to recognition of fingerprint images by fingerprint algorithm.

Further, the image sensor further includes a third photosensitive region disposed at a position corresponding to the non-opaque region. The fingerprint image is acquired based on the reflected light acquired by the first photosensitive region, the second photosensitive region and the third photosensitive region, which may effectively increase an area where the image sensor can acquire the first and second reflected light, which is conducive to increase an area of the acquired fingerprint image.

Further, the fingerprint imaging module further includes a light shielding layer disposed between the first photosensitive region of the image sensor and the first light source and between the second photosensitive region of the image sensor and the second light source. The light shielding layer can block incident light irradiating onto the first photosensitive region and the second photosensitive region, so as to reduce interference of the incident light on acquisition of the first and second reflected light by the first photosensitive region and the second photosensitive region, which is conducive to improve a signal-to-noise ratio of the image sensor and quality of the acquired fingerprint image.

BRIEF DESCRIPTION OF THE DRAWINGS

To describe technical solutions in the embodiments of the present disclosure or in the existing techniques more clearly, accompanying drawings required for describing the embodiments or the existing techniques are briefly described below. Apparently, the accompanying drawings in the following description are merely a portion of embodiments of the present disclosure. For those skilled in the art, other drawings may be obtained based on these drawings without any creative effort.

DETAILED DESCRIPTION

As described in the background, the colored fingerprint imaging module in the existing techniques has a poor imaging effect. Reasons for the poor imaging effect are described below based on a structure of the fingerprint imaging module.

Figure 1:
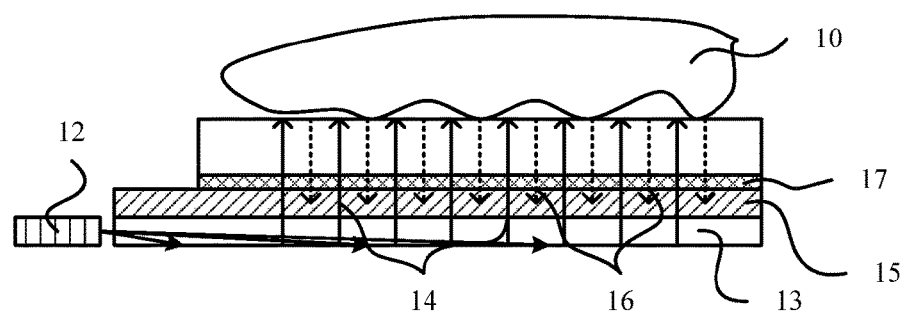
FIG. 1 schematically illustrates a sectional view of an optical fingerprint imaging module.

Referring to FIG. 1, a sectional view of an optical fingerprint imaging module is illustrated.

Light emitted from the light source 12 passes through a light guide plate 13 to form incident light 14 which then penetrates through an image sensor 15, irradiates onto a surface of a finger 10 and is reflected by the finger 10 to form reflected light 16. The image sensor 15 receives the reflected light 16 and processes the reflected light 16 to obtain a fingerprint image of the finger 10.

In the existing techniques, in order to adapt a color of appearance of the fingerprint imaging module to appearance design of a device, a color layer 17 with a certain color is arranged on the image sensor 15 to make the fingerprint imaging module have a certain color of appearance.

In the existing techniques, optical fingerprint imaging module uses a backlight source, that is, the light source 12 is disposed at one side of the light guide plate 13 which is disposed below the image sensor 15. Therefore, the incident light 14 needs to be transmitted by the image sensor 15 and the color layer 17 sequentially when irradiating onto the surface of the finger 10. Both the image sensor 15 and the color layer 17 affect intensity of the incident light 14 irradiating onto the finger 10, where influence of the color layer 17 is particularly great.

The color layer 17 is usually a functional optical film formed by an optical coating method or an ink layer formed by a screen printing process. When the color layer 17 is an ink layer, particles in the ink layer may have a serious scattering effect on the incident light, which seriously affects light intensity of the incident light 14 irradiating onto the finger 10 and affects quality of fingerprint images acquired by the image sensor 15 receiving the reflected light 16. Especially when a color of the ink layer is white or gold, a scattering effect of the particles in the ink layer is relatively strong, and even fingerprint images may not be obtained.

When the color layer 17 is a film formed by optical coating, although light transmittance can be controlled and the intensity of the incident light 14 irradiating onto the finger 10 can be increased, it is difficult for the optical coating method to control a color of the film. Appearance of the fingerprint imaging mode is prone to have a color aberration.

To increase incident light transmittance of the color layer to enhance the intensity of the incident light irradiating onto the surface of the finger to obtain reflected light with higher light intensity and improve quality of the obtained fingerprint image, a non-opaque region with relatively high light transmittance may be disposed in the color layer.

Figure 2:
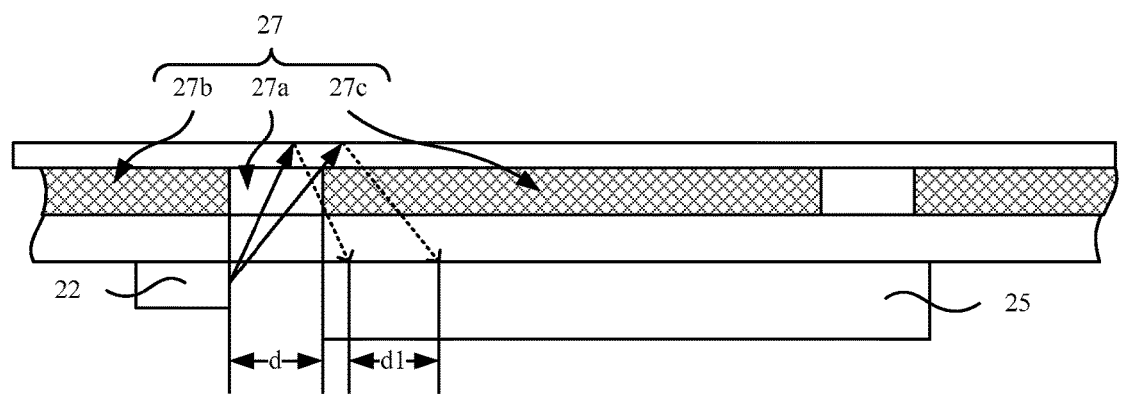
FIG. 2 schematically illustrates a sectional view of another optical fingerprint imaging module.

Specifically, referring to FIG. 2, a sectional view of another optical fingerprint imaging module is illustrated.

In the fingerprint imaging module, the color layer 27 includes a non-opaque region 27a and a first colored region 27b and a second colored region 27c respectively disposed at two sides of the non-opaque region 27a. The first colored region 27b is disposed over the light source 22 for transmitting incident light.

However, to obtain a better coloring effect to make an electronic device integrated with the fingerprint imaging module have better appearance, the light source 22 or the image sensor 25 is prevented from being exposed by the non-opaque region 27a. Therefore, along a direction from the first colored region 27b to the second colored region 27c, a size d of the non-opaque region should not be too large.

However, a too small size d of the non-opaque region 27a greatly affects a range of the reflected light irradiating onto the surface of the image sensor 25. As shown in FIG. 2, to achieve a good coloring effect, the size d of the non-opaque region 27a cannot be too large. Therefore, when the incident light is transmitted to from the non-opaque region 27a, the formed reflected light can only irradiate to a small portion of the image sensor 25 (an area shown as d1 in FIG. 2), that is, the image sensor 25 can only perform fingerprint imaging in a small area. A small fingerprint imaging area may cause a size of the obtained fingerprint image to be small, which further affects subsequent fingerprint image recognition and makes the obtained fingerprint image difficult to be applied in recognition by fingerprint recognition algorithm.

In order to solve the technical problems, embodiments of the present disclosure provide a fingerprint imaging module having a first light source and a second light source, wherein generated first incident light and second incident light are transmitted crosswise and transmitted through a non-opaque region, so as to form first reflected light and second reflected light. In this way, an area of the image sensor 140 acquiring the reflected light is larger, and a size of obtained fingerprint images may be effectively increased, which is conducive to improve accuracy of fingerprint recognition.

In order to clarify the object, characteristic and advantages of embodiments of the present disclosure, embodiments of present disclosure will be described clearly in detail in conjunction with accompanying drawings.

Figure 3:
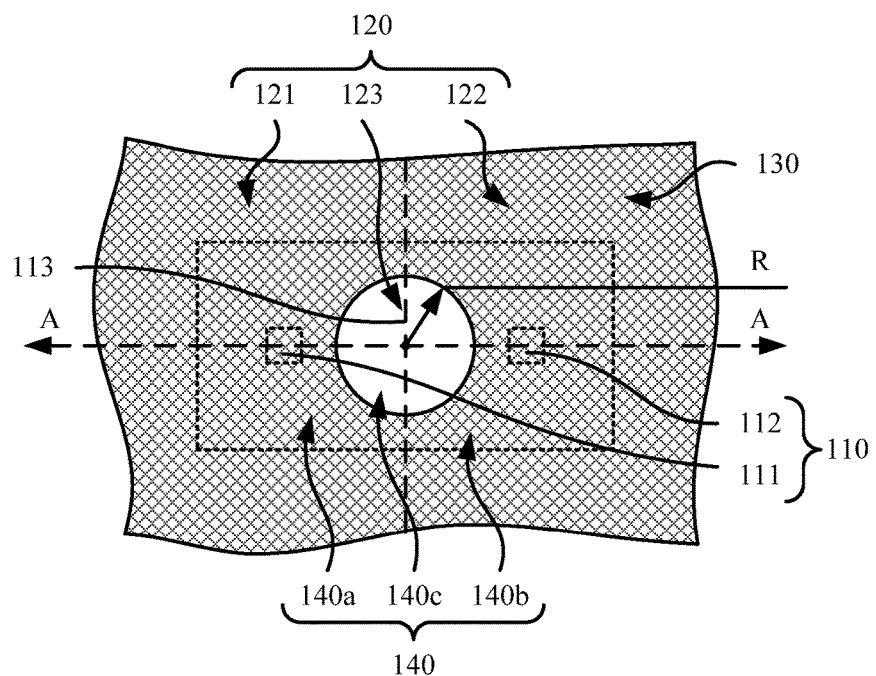
FIG. 3 schematically illustrates a top view of a fingerprint imaging module according to an embodiment.
Figure 4:
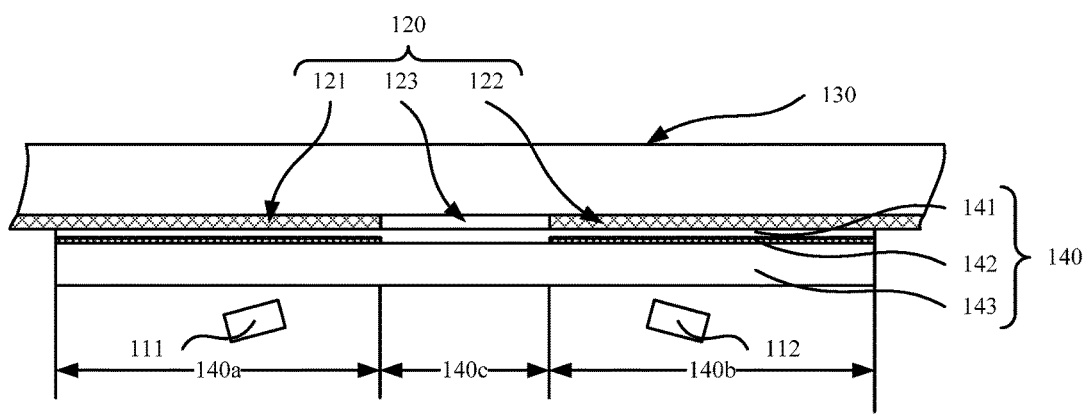
FIG. 4 schematically illustrates a sectional view of the fingerprint imaging module along an A-A line in FIG. 3.

Referring to FIGS. 3 and 4, a schematic structural diagram of a fingerprint imaging module according to an embodiment is illustrated. FIG. 3 schematically illustrates a top view of a fingerprint imaging module according to an embodiment, and FIG. 4 schematically illustrates a sectional view of the fingerprint imaging module along an A-A line in FIG. 3.

The fingerprint imaging module includes: a light source assembly 110 including a first light source 111 for generating first incident light and a second light source 112 for generating second incident light, wherein the first light source 111 and the second light source 112 are disposed with an interval therebetween; a color layer 120 disposed at a side of the light source assembly 110 and including a non-opaque region 123 which penetrates through thickness of the color layer 120, wherein the non-opaque region 123 is disposed corresponding to the interval between the first light source 111 and the second light source 112, and adapted to transmit the first incident light and the second incident light; a sensing surface 130 disposed at a side of the color layer 120 which is away from the light source assembly 110, wherein the first incident light is transmitted by the non-opaque region 123 to form first reflected light on the sensing surface 130, and the second incident light is transmitted by the non-opaque region 123 to form second reflected light on the sensing surface 130; and an image sensor 140 disposed between the light source assembly 110 and the color layer 120 and including a first photosensitive region 140a and a second photosensitive region 140b, wherein the first photosensitive region 140a is disposed corresponding to a position of the first light source 111, the second photosensitive region 140b is disposed corresponding to a position of the second light source 112, and the image sensor 140 is configured to acquire the first reflected light and the second reflected light to acquire a fingerprint image.

As the first light source 111 and the second light source 112 are respectively disposed at two sides of the non-opaque region 123, first and second reflected light are formed to irradiate onto different portions of the image sensor 140. Therefore, an area where the image sensor 140 can acquire the first and second reflected light is larger. That is, a fingerprint imaging area of the image sensor 140 is increased, and thus a size of the acquired fingerprint image is increased, which is conducive to recognition of fingerprint images by fingerprint algorithm.

The first light source 111 is adapted to generate the first incident light, and the second light source 112 is adapted to generate the second incident light. In some embodiments, the first light source 111 and the second light source 112 are both light emitting diodes.

The first incident light and the second incident light may be visible light or non-visible light. Specifically, the first incident light and the second incident light may be near ultraviolet light, purple light, blue light, green light, yellow light, red light, near infrared light or white light.

The first light source 111 and the second light source 112 are disposed with an interval therebetween, so that the non-opaque region 123 can be disposed at the interval between the first light source 111 and the second light source 112.

The color layer 120 is disposed at a side of the light source assembly 110 to make the fingerprint imaging module appear a certain color of appearance, so as to adapt appearance design of an electronic device integrated with the fingerprint imaging module.

The non-opaque region 123 is adapted to transmit the first incident light and the second incident light, so as to improve light transmittance of the first incident light and the second incident light penetrating through the color layer 120 and improve light intensity of the first incident light and the second incident light irradiating on a surface of a finger, which is conducive to improve light intensity of the first reflected light and the second reflected light and quality of the acquired fingerprint image.

The color layer 120 further includes a first colored region 121 and a second colored region 122 disposed on two sides of the non-opaque region 123. The first colored region 121 corresponds to the first light source 111, and the second colored region 122 corresponds to the second light source 112. Specifically, the first colored region 121 and the second colored region 122 may include ink or coating materials, and may be formed by screen printing or coating.

In some embodiments, in order to match appearance design of the electronic device, colors of the first colored region 121 and the second colored region 122 are white, gold or silver. Therefore, the first incident light and the second incident light is strongly scattered by the first colored region 121 and the second colored region 122. Accordingly, the first colored region 121 and the second colored region 122 cause lower transmittance of the first incident light and the second incident light. In some embodiments, the colors of the first colored region and the second colored region may be other colors.

The light transmittance of the non-opaque region 123 is higher than that of the first colored region 121 and the second colored region 122, so as to improve the light transmittance of the first incident light and the second light penetrating through the color layer 120. In some embodiments, a material of the non-opaque region 123 is a UV optical clear adhesive, so as to improve a light transmitting effect of the non-opaque region 123 and reduce influence of the non-opaque region 123 on the first incident light and the second incident light. In some embodiments, the non-opaque region may be a blank area without being formed with ink.

The sensing surface 130 is adapted to receive a touch. The first incident light and the second incident light transmitted through the non-opaque region 123 irradiate onto the sensing surface 130 to be reflected and refracted, to form first reflected light and second reflected light carrying fingerprint information, respectively.

In some embodiments, the fingerprint imaging module further includes a glass cover (not shown) disposed on the first light source 111 and the second light source 112. The color layer 120 is attached to a surface of the glass cover facing the first light source 111 and the second light source 112. A surface of the glass cover facing away from the first light source 111 and the second light source 112 is the sensing surface 130.

A distance between the first light source 111 and the sensing surface 130 is equal to a distance between the second light source 112 and the sensing surface 130. In this way, optical path length between the first light source 111 and the sensing surface 130 and optical path length between the second light source 112 and the sensing surface 130 are equal, that is, optical path length the first incident light irradiating onto the sensing surface 130 and optical path length the second incident light irradiating onto the sensing surface 130 are equal, which may be conducive to improve uniformity of light intensity of the first incident light and the second incident light on the sensing surface 130 and quality of the fingerprint image.

As shown in FIGS. 3 and 4, a shape of the non-opaque region 123 is an axisymmetric pattern, thus the non-opaque region 123 has at least one symmetry axis. In a direction parallel to the sensing surface 130, the first light source 111 and the second light source 112 are disposed at two sides of the symmetry axis of the non-opaque region.

Projection of the first light source 111 on the surface of the color layer 120 is first projection, and projection of the second light source 112 on the surface of the color layer 120 is second projection. The first projection and the second projection are disposed at two sides of the symmetry axis of the non-opaque region 123.

In addition, the first light source 111 and the second light source 112 are mirroredly disposed with respect to the symmetry axis of the non-opaque region 123. Therefore, the first projection and the second projection are disposed symmetrically with respect to the symmetry axis of the non-opaque region 123. The first projection and the second projection are disposed on both sides of the symmetry axis of the non-opaque region 123 respectively, and a distance between the first projection and the symmetry axis of the non-opaque region 123 is equal to a distance between the second projection and the symmetry axis of the non-opaque region 123.

The first light source 111 and the second light source 112 are disposed in such a way that the optical path length of the first incident light irradiating onto the sensing surface 130 and the optical path length of the second incident light irradiating onto the sensing surface 130 are equal, which is conducive to improve the uniformity of light intensity of the first incident light and the second incident light on the sensing surface 130 and quality of the acquired fingerprint image.

In some embodiments, a shape of the non-opaque region 123 is circle, and a straight line 113 passing through the center of the circle is a symmetry axis of the circular non-opaque region 123. Therefore, the above arrangement manner of the first light source 111 and the second light source 112 enables the first projection and the second projection be disposed at both sides of the straight line 113 respectively, and the straight line 113 is a mid-perpendicular line of a connection line between the first projection and the second projection.

In some embodiments, the first colored region 121 and the second colored region 122 communicate with each other and surround the non-opaque region 123. The first colored region 121 and the second colored region 122 are arranged to be in communication with each other to effectively improve aesthetics of the fingerprint imaging module. In addition, this method may also make the non-opaque region 123 present a closed pattern, so that the non-opaque region 123 can function as a fingerprint identification mark. In some embodiments, the first colored region and the second colored region may not communicate with each other, and may be respectively disposed at two sides of the non-opaque region.

An area of the non-opaque region 123 should not be too large or too small, that is, a radius R of the circular non-opaque region 123 should not be too large nor too small.

If the radius R of the circular non-opaque region 123 is too small, that is, the area of the non-opaque region 123 is too small, light intensity of the incident light transmitted through the non-opaque region 123 may be affected, thereby affecting a function of the non-opaque region 123 on improving light transmittance of the incident light, which may further affect the quality of the acquired fingerprint image. If the radius R of the circular non-opaque region 123 is too large, that is, the area of the non-opaque region 123 is too large, areas of the first colored region 121 and the second colored region 122 are correspondingly reduced under same conditions, which may affect a coloring effect of the fingerprint imaging module and appearance of the electronic device. Specifically, the radius R of the circular non-opaque region 123 is within a range from 2 mm to 5 mm.

Therefore, by setting the size of the non-opaque region 123 within a reasonable range, the area of the non-opaque region 123 is within a range from 16 mm$^2$ to 80 mm$^2$, so as to improve the transmittance of the incident light and the coloring effect of the fingerprint imaging module.

The image sensor 140 is configured to acquire the first reflected light and the second reflected light to acquire the fingerprint image.

The image sensor 140 is disposed between the light source assembly 110 and the color layer 120. The first photosensitive region 140a corresponds to a position of the first light source 111, and the second photosensitive region 140b corresponds to the position of the second light source 112. Therefore, in a plane parallel to the sensing surface 130, the first photosensitive region 140a and the second photosensitive region 140b are disposed at two sides of the non-opaque region 123, the first photosensitive region 140a is disposed at a side of the non-opaque region 123 close to the first light source 111, and the second photosensitive region 140b is disposed at a side of the non-opaque region 123 close to the second light source 112.

The first photosensitive region 140a is disposed between the first light source 111 and the first colored region 121, and the second photosensitive region 140b is disposed between the second light source 112 and the second colored region 122.

Therefore, in the plane parallel to the sensing surface 130, the first photosensitive region 140a is disposed facing the second light source 112, and the second photosensitive region 140b is disposed facing the first light source 111.

Figure 5:
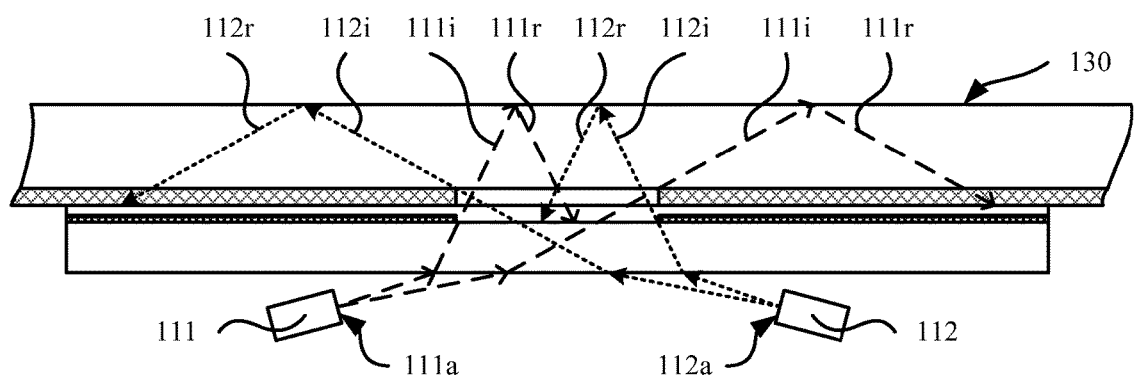
FIG. 5 schematically illustrates a diagram of a light path of the fingerprint imaging module in FIG. 3.

Referring to FIG. 5, a diagram of an optical path of the first reflected light and the second reflected light acquired in the fingerprint imaging module shown in FIG. 3 is schematically illustrated.

During fingerprint recognition, the first incident light 111i transmitted through the non-opaque region 123 irradiates onto the sensing surface 130 to form the first reflected light 111r on the sensing surface 130. The second incident light 112i transmitted through the non-opaque region 123 irradiates onto the sensing surface 130 to form the second reflected light 112r on the sensing surface 130.

The first reflected light 111r propagates towards a direction away from the first light source 111, irradiates onto the second photosensitive region 140b facing the first light source 111, and is acquired by the second photosensitive region 140b. The second reflected light 111r propagates towards a direction away from the second light source 112, irradiates onto the first photosensitive region 140a facing the second light source 112, and is acquired by the first photosensitive region 140a.

Therefore, the first incident light 111i generated by the first light source 111 and the second incident light 112i generated by the second light source 112 propagate crosswise and are transmitted through the non-opaque region to irradiate onto the sensing surface 130, to form the first reflected light 111r and the second reflected light 112r, respectively. The image sensor 140 acquires the fingerprint image according to the first reflected light 111r and the second reflected light 112r. Therefore, in embodiments of the present disclosure, an area of the image sensor 140 acquiring the reflected light is larger, and a size of obtained fingerprint image may be effectively increased, which is conducive to improve accuracy of fingerprint recognition.

It should be noted that, as shown in FIG. 4, the image sensor 140 further includes a third photosensitive region 140c disposed at a position corresponding to the non-opaque region 123.

Referring to FIG. 5, due to different incident angles, the first reflected light 111r and the second reflected light 112r formed on the sensing surface 130 can not only irradiate to the second photosensitive region 140b and the first photosensitive region 140a, but may also irradiate onto the third photosensitive region 140c. Therefore, the third photosensitive region 140c is adapted to acquire the first reflected light 111r and the second reflected light 112r irradiating onto the third photosensitive region 140c to acquire the fingerprint image.

Therefore, in some embodiments, the image sensor 140 acquires a fingerprint image based on the first reflected light 111r and the second reflected light 112r acquired by the first photosensitive region 140a, the second photosensitive region 140b and the third photosensitive region 140c.

In some embodiments, the image sensor may include only the first photosensitive region and the second photosensitive region. When the image sensor includes only the first photosensitive region and the second photosensitive region, the first photosensitive region and the second photosensitive region respectively acquire the second reflected light and the first reflected light to acquire the fingerprint image.

Still referring to FIG. 4, in some embodiments, the fingerprint imaging module further includes a light blocking layer 142 disposed between the first photosensitive region 140a of the image sensor 140 and the first light source 111 and between the second photosensitive region 140b of the image sensor 140 and the second light source 112.

Specifically, the image sensor 140 includes a non-opaque substrate 143 and a photosensitive layer 141 disposed at a side of the non-opaque substrate 143 away from the first light source 111 and the second light source 112. The photosensitive layer 141 has a photosensitive device formed therein, and the first photosensitive region 140a and the second photosensitive region 140b are disposed in the photosensitive layer 141. The light blocking layer 142 is disposed between the photosensitive layer 141 and the non-opaque substrate 143.

Specifically, the light blocking layer 142 may include metal. By using metal as a material, the light blocking layer 142 can be formed in a process of forming the photosensitive device without additional process steps, which is conducive to reduce manufacturing cost of the light blocking layer 142.

In some embodiments, the light blocking layer may be disposed between the non-opaque substrate and the first light source and between the non-opaque substrate and the second light source. Alternatively, the light blocking layer is provided by using a light blocking substrate at the corresponding position of the first photosensitive region and the corresponding position of the second photosensitive region.

It should be noted that, as shown in FIG. 5, in some embodiments, the first light source 111 has a first light emitting surface 111a, and the first incident light 111i is emitted from the first light emitting surface 111a; and the second light source 112 has a second light emitting surface 112a, and the second incident light 112i is emitted from the second light emitting surface 112a.

In order to transmit as much as possible of the first incident light 111i and the second incident light 112i through the non-opaque region 123, the first light emitting surface 111a and the second light emitting surface 112a are disposed toward the non-opaque region 123. Specifically, an included angle between the first light emitting surface 111a and the sensing surface 130 is within a range from 15° to 45°, and an included angle between the second light emitting surface 112a and the sensing surface 130 is within a range from 15° to 45°. Therefore, the first light emitting surface 111a and the sensing surface 130 are obliquely crossed with an included angle within a range from 15° to 45°, and the second light emitting surface 112a and the sensing surface 130 are obliquely crossed with an included angle within a range from 15° to 45°.

Specifically, the first light source 111 has a first back surface opposite to the first light emitting surface 111a. Based on the configuration that the first light emitting surface 111a and the sensing surface 130 are obliquely crossed, a distance between the sensing surface 130 and a center of the first light emitting surface 111a is shorter than a distance between the sensing surface 130 and a center of the first back surface. The second light source 112 has a second back surface opposite to the second light emitting surface 111b. Based on the configuration that the second light emitting surface 111b and the sensing surface 130 are obliquely crossed, a distance between the sensing surface 130 and a center of the second light emitting surface 111b is shorter than a distance between the sensing surface 130 and a center of the second back surface.

By disposing the first light emitting surface 111a and the second light emitting surface 112a toward the non-opaque region 123, an incidence angle of the first incident light 111i and the second incident light 112i irradiating onto the sensing surface 130 may be reduced, which is conducive to improve a size and quality of the fingerprint image.

In addition, in some embodiments, in order to fix the image sensor 140, the fingerprint imaging module further includes an adhesive layer (not shown) between the image sensor 140 and the color layer 120, for achieving attachment between the image sensor 140 and the color layer 120.

Specifically, the adhesive layer is a UV optical clear adhesive. Therefore, in some embodiments, the adhesive layer covers surfaces of the first colored region 121, the second colored region 122 and the non-opaque region 123.

In some embodiments, a shape of the non-opaque region 123 is circle. In some embodiments, the shape of the non-opaque region may be other axisymmetric shapes, such as a square, an oval or a cross.

Figure 6:
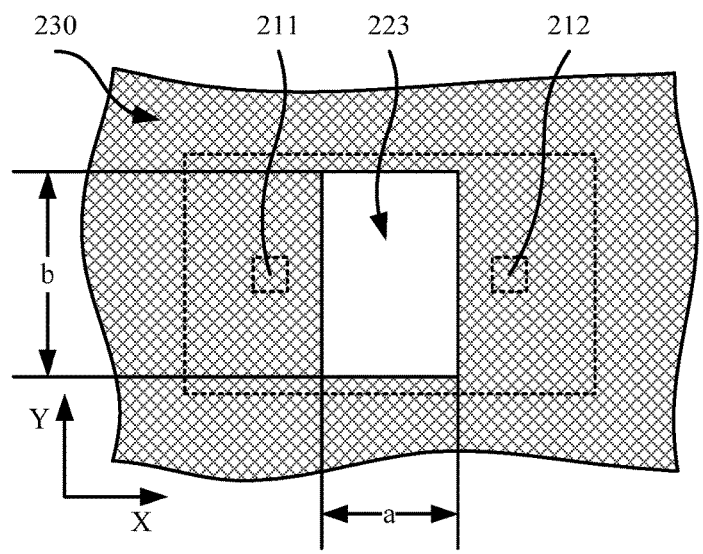
FIG. 6 schematically illustrates a top view of a fingerprint imaging module according to an embodiment.

Referring to FIG. 6, a top view of a fingerprint imaging module according to an embodiment is illustrated.

Common features between the embodiment and the above embodiment shown in FIGS. 3 to 5 are not described here. Differences between the embodiment and the above embodiment lie in that the shape of the non-opaque region 223 is square. Length of a side of the square non-opaque region 223 is within a range from 6 mm to 12 mm.

In addition, in some embodiments, the sensing surface 230 has a first direction Y and a second direction X perpendicular to each other, a size b of the non-opaque region 223 along the first direction Y is greater than or equal to a size a along the second direction X. The first light source 211 and the second light source 212 are arranged along the second direction X.

Therefore, as shown in FIG. 6, in some embodiments, the non-opaque region 223 is rectangular with long and wide sides perpendicular to each other, length b of the long side is within a range from 6 mm to 12 mm, and length a of the wide side is also within the range from 6 mm to 12 mm.

An extending direction of the long side is the first direction Y, and an extending direction of the wide side is the second direction X. The first light source 211 and the second light source 212 are arranged along a direction in which the wide sides of the rectangular non-opaque region 223 extend, that is, the first light source 211 and the second light source 212 are disposed at both sides of the non-opaque region 223 along the direction in which the wide sides extend. In this way, transmitted light intensity of the first incident light and the second incident light may be effectively improved, which is conducive to improve quality of the fingerprint image.

It should be noted that, in some embodiments, the shape of the non-opaque region may be a square.

Figure 7:
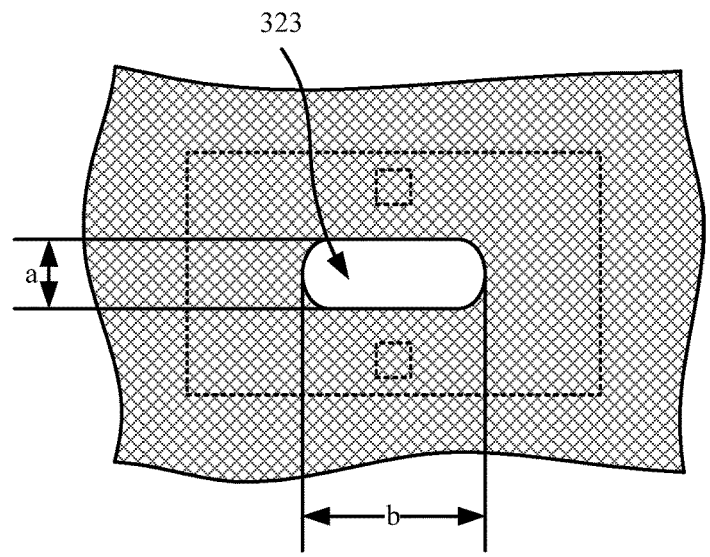
FIG. 7 schematically illustrates a top view of a fingerprint imaging module according to an embodiment.

Referring to FIG. 7, a top view of a fingerprint imaging module according to an embodiment is illustrated.

In the embodiment, the non-opaque region 323 is oval in shape, length b of the oval non-opaque region 323 is within a range from 6 mm to 12 mm, and width a of the oval non-opaque region 323 is within a range from 2 mm to 6 mm.

Figure 8:
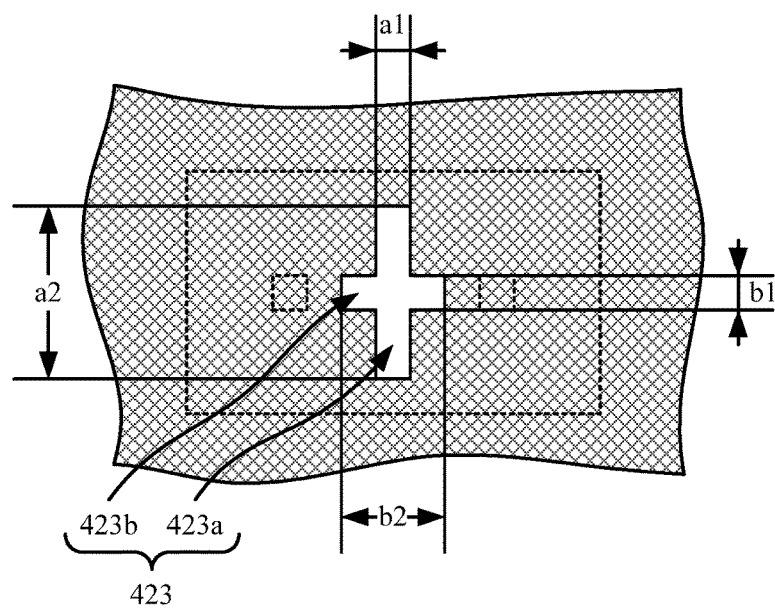
FIG. 8 schematically illustrates a top view of a fingerprint imaging module according to an embodiment.

Referring to FIG. 8, a top view of a fingerprint imaging module according to an embodiment is illustrated.

In some embodiments, the shape of the non-opaque region 423 is cross.

The cross-shaped non-opaque region 423 includes a first cross side 423a and a second cross side 423b perpendicular to each other, length of the first cross side 423a is greater than or equal to length of the second cross side 423b, the length a2 of the first cross side 423a is within a range from 6 mm to 12 mm, width a1 of the first cross side 423a is within a range from 1 mm to 2 mm, the length b2 of the second cross side 423b is within a range from 2 mm to 4 mm, and width b1 of the second cross side 423b is within a range from 1 mm to 2 mm.

Accordingly, in an embodiment, an electronic device is provided, including: a protective cover, and the fingerprint imaging module provided in the embodiments of the present disclosure, wherein the color layer is disposed on a surface of the protective cover facing the image sensor.

The protective cover is used for isolating electronic device hardware from external environment to protect the electronic device.

In some embodiments, the electronic device is a mobile phone or a tablet computer, and the protective cover is a glass cover of a display screen of the electronic device. In some embodiments, the protective cover may be other covers.

The fingerprint imaging module is used for acquiring fingerprint images. Details of the fingerprint imaging module can be found in the above embodiments of the fingerprint imaging module, and are not described here.

The color layer is disposed on a surface of the protective cover facing the image sensor, which is conducive to reduce possibility of damage to the color layer and improve stability of the color layer. Specifically, the color layer may be formed on the surface of the protective cover by screen printing or coating.

A surface of the protective cover opposite to the image sensor is a sensing surface. During fingerprint sensing, a finger presses against the surface of the protective cover to achieve fingerprint acquisition.

From above, as the first light source and the second light source are respectively disposed at two sides of the non-opaque region, first and second reflected light are formed to irradiate onto different portions of the image sensor. The image sensor includes the first photosensitive region corresponding to the position of the first light source and the second photosensitive region corresponding to the position of the second light source, so that an area where the image sensor can acquire the first and second reflected light is larger. That is, a fingerprint imaging area of the image sensor is increased, and thus a size of the acquired fingerprint image is increased, which is conducive to recognition of fingerprint images by fingerprint algorithm. Further, the image sensor further includes a third photosensitive region disposed at a position corresponding to the non-opaque region. The fingerprint image is acquired based on the reflected light acquired by the first photosensitive region, the second photosensitive region and the third photosensitive region, which may effectively increase an area where the image sensor can acquire the first and second reflected light, which is conducive to increase an area of the acquired fingerprint image. Further, the fingerprint imaging module further includes a light shielding layer disposed between the first photosensitive region of the image sensor and the first light source and between the second photosensitive region of the image sensor and the second light source. The light shielding layer can block incident light irradiating onto the first photosensitive region and the second photosensitive region, so as to reduce interference of the incident light on acquisition of the first and second reflected light by the first photosensitive region and the second photosensitive region, which is conducive to improve a signal-to-noise ratio of the image sensor and quality of the acquired fingerprint image.

Basic principles, main features and advantages of the present disclosure are described above. It should be understood by those skilled in the art that the present disclosure is not limited to the above embodiments, and the above embodiments and description only illustrate the principles of the present disclosure. Those skilled in the art can modify and vary the embodiments without departing from the spirit and scope of the present disclosure. The scope of the present disclosure is defined by appended claims and their equivalents.

What is claimed is:

1. A fingerprint imaging module, comprising:
   a light source assembly comprising a first light source for generating first incident light and a second light source for generating second incident light, wherein the first light source and the second light source are disposed with an interval therebetween;
   a color layer disposed at a side of the light source assembly and comprising a non-opaque region which penetrates through thickness of the color layer, wherein the non-opaque region is disposed corresponding to the interval between the first light source and the second light source, and adapted to transmit the first incident light and the second incident light;
   a sensing surface disposed at a side of the color layer which is away from the light source assembly, wherein the first incident light is transmitted by the non-opaque region to form first reflected light on the sensing surface, and the second incident light is transmitted by the non-opaque region to form second reflected light on the sensing surface; and
   an image sensor disposed between the light source assembly and the color layer and comprising a first photosensitive region and a second photosensitive region, wherein the first photosensitive region is disposed corresponding to a position of the first light source, the second photosensitive region is disposed corresponding to a position of the second light source, and the image sensor is configured to acquire the first reflected light and the second reflected light to acquire a fingerprint image.

2. The fingerprint imaging module according to claim 1, wherein a distance between the first light source and the sensing surface is equal to a distance between the second light source and the sensing surface.

3. The fingerprint imaging module according to claim 2, wherein a shape of the non-opaque region is an axisymmetric pattern, and along a direction parallel to the sensing surface, the first light source and the second light source are disposed at two sides of a symmetry axis of the non-opaque region.

4. The fingerprint imaging module according to claim 3, wherein the first light source and the second light source are mirroredly disposed with respect to the symmetry axis of the non-opaque region.

5. The fingerprint imaging module according to claim 1, wherein the first light source has a first light emitting surface, the second light source has a second light emitting surface, and the first light emitting surface and the second light emitting surface are disposed toward the non-opaque region.

6. The fingerprint imaging module according to claim 5, wherein an included angle between the first light emitting surface and the sensing surface is within a range from 15° to 45°, and an included angle between the second light emitting surface and the sensing surface is within a range from 15° to 45°.

7. The fingerprint imaging module according to claim 1, wherein the sensing surface has a first direction and a second direction perpendicular to each other, a size of the non-opaque region in the first direction is greater than or equal to a size of the non-opaque region in the second direction, and the first light source and the second light source are disposed along the second direction.

8. The fingerprint imaging module according to claim 1, wherein a shape of the non-opaque region is circle, square, oval or cross.

9. The fingerprint imaging module according to claim 8, wherein a shape of the non-opaque region is circle, and a radius of the circular non-opaque region is within a range from 2 mm to 5 mm.

10. The fingerprint imaging module according to claim 8, wherein a shape of the non-opaque region is square, and length of a side of the square non-opaque region is within a range from 6 mm to 12 mm.

11. The fingerprint imaging module according to claim 8, wherein a shape of the non-opaque region is oval, length of the oval non-opaque region is within a range from 6 mm to 12 mm, and width of the oval non-opaque region is within a range from 2 mm to 6 mm.

12. The fingerprint imaging module according to claim 8, wherein a shape of the non-opaque region is cross, the crossed non-opaque region comprises a first cross side and a second cross side perpendicular to each other, length of the first cross side is greater than or equal to length of the second cross side, the length of the first cross side is within a range from 6 mm to 12 mm, width of the first cross side is within a range from 1 mm to 2 mm, the length of the second cross side is within a range from 2 mm to 4 mm, and width of the second cross side is within a range from 1 mm to 2 mm.

13. The fingerprint imaging module according to claim 1, wherein an area of the non-opaque region is within a range from 16 $mm^2$ to 80 $mm^2$.

14. The fingerprint imaging module according to claim 1, wherein the image sensor further comprises a third photosensitive region disposed at a position corresponding to the non-opaque region.

15. The fingerprint imaging module according to claim 1, further comprising a light blocking layer disposed between the first photosensitive region of the image sensor and the first light source and between the second photosensitive region of the image sensor and the second light source.

16. The fingerprint imaging module according to claim 15, wherein the light blocking layer comprises a metal.

17. The fingerprint imaging module according to claim 1, wherein the first light source and the second light source are light emitting diodes.

18. An electronic device, comprising:
   a protective cover; and
   a fingerprint imaging module, wherein the fingerprint imaging module comprises:
      a light source assembly comprising a first light source for generating first incident light and a second light source for generating second incident light, wherein the first light source and the second light source are disposed with an interval therebetween;
      a color layer disposed at a side of the light source assembly and comprising a non-opaque region which penetrates through thickness of the color layer, wherein the non-opaque region is disposed corresponding to the interval between the first light source and the second light source, and adapted to transmit the first incident light and the second incident light;

a sensing surface disposed at a side of the color layer which is away from the light source assembly, wherein the first incident light is transmitted by the non-opaque region to form first reflected light on the sensing surface, and the second incident light is transmitted by the non-opaque region to form second reflected light on the sensing surface; and an image sensor disposed between the light source assembly and the color layer and comprising a first photosensitive region and a second photosensitive region, wherein the first photosensitive region is disposed corresponding to a position of the first light source, the second photosensitive region is disposed corresponding to a position of the second light source, and the image sensor is configured to acquire the first reflected light and the second reflected light to acquire a fingerprint image, wherein the color layer is disposed on a surface of the protective cover which faces the image sensor.

* * * * *